United States Patent [19]

Cannella

[11] Patent Number: 4,639,087

[45] Date of Patent: Jan. 27, 1987

[54] DISPLAYS HAVING PIXELS WITH TWO PORTIONS AND CAPACITORS

[75] Inventor: Vincent D. Cannella, Birmingham, Mich.

[73] Assignee: Energy Conversion Devices, Inc., Troy, Mich.

[21] Appl. No.: 639,001

[22] Filed: Aug. 8, 1984

[51] Int. Cl.⁴ .............................................. G02F 1/133
[52] U.S. Cl. .................................. 350/332; 350/336; 350/339 R
[58] Field of Search ............ 350/332, 333, 334, 339 R, 350/336

[56] References Cited

U.S. PATENT DOCUMENTS

| | | | |
|---|---|---|---|
| 3,532,813 | 10/1970 | Lechner | 350/332 |
| 3,612,654 | 10/1971 | Klein | 350/339 R |
| 3,654,606 | 4/1972 | Marlowe et al. | |
| 3,807,831 | 4/1974 | Soref | 350/336 |
| 4,042,920 | 8/1977 | Harsch et al. | 350/332 X |
| 4,231,640 | 11/1980 | Funada et al. | 350/336 |
| 4,385,292 | 5/1983 | Nonomura et al. | 350/334 X |
| 4,389,095 | 6/1983 | Teshima et al. | 350/334 |
| 4,431,271 | 2/1984 | Okubo | 350/334 |
| 4,449,125 | 4/1984 | Clerc et al. | 350/333 X |
| 4,493,531 | 1/1985 | Bohmer et al. | 350/334 |
| 4,509,828 | 4/1985 | Clerc et al. | 350/334 |
| 4,537,471 | 8/1985 | Grinberg et al. | 350/332 X |
| 4,542,960 | 9/1985 | Yang | 350/336 |
| 4,547,042 | 10/1985 | Ngo | 350/336 |

OTHER PUBLICATIONS

Szydlo et al, "New Amorphous Silicon Nonlinear Element for Liquid Crystal Display Addressing", Appl. Phys. Lett., 44(2), 15 Jan. '84, pp. 205-206.
Castleberry, "Control Layers for Liquid Crystal Matrix Displays", 1980, Biennial Display Research Conference, Oct. 1980, pp. 89-92.

*Primary Examiner*—John K. Corbin
*Assistant Examiner*—David Lewis
*Attorney, Agent, or Firm*—Lawrence G. Norris; Robert S. Nolan; Richard O. Gray

[57] ABSTRACT

Light influencing subassemblies and displays each having a structure in which all of the addressed pixel electronic circuitry including an optimized capacitance and including isolation devices where utilized, are located at one electrode side of each pixel electrode combination. The structure includes the subdivision of one pixel electrode into at least two spaced apart side-by-side electrode segments opposite a common electrode. The displays include light influencing material disposed between the segmented and common electrodes which form a first capacitance. A second capacitance is formed electrically in parallel with the first capacitance. The second capacitance can include an additional capacitance electrode formed separated from the segmented electrode by an insulating layer. The electrode segments further can include at least one isolation device coupled to at least one of the segments which facilitates selective excitation of the pixel elements and applied potential reversal across the electrodes during alternate display frames. The displays have an increased manufacturing yield, optimized capacitance and increased isolation. Also disclosed is a method of making the subassemblies and displays.

28 Claims, 10 Drawing Figures

DISPLAYS HAVING PIXELS WITH TWO PORTIONS AND CAPACITORS

FIELD OF THE INVENTION

The present invention relates generally to light influencing displays and subassemblies.

BACKGROUND

There are many applications wherein light influencing displays are utilized to advantage. For example, light influencing displays find use in digital watches, digital clocks, calculators, pocket sized television receivers, and various forms of portable games, to name just a few.

Light influencing displays can be formed in many configurations. By the term "light influencing material" is meant any material which emits light or can be used to selectively vary the intensity, phase, or polarization of light either being reflected from or transmitted through the material. Liquid crystal material is only one such material having these characteristics. Generally, each pixel includes a pair of electrodes which can be individually addressable. As is well known, when a voltage is applied across the electrodes, the optical properties of the light influencing material can be changed to provide a light or dark display depending upon the type of material used and the desired mode of operation of the display.

An increasingly important type of light influencing display matrix includes a large number of pixel elements arranged in rows and columns. Because of the large number of pixels in the matrix arrays, the electrode line connections to each pixel are on common lines with other pixels. In this so-called multiplexing scheme, each pixel is located at a unique intersection of two address lines. The pixels are individually addressed by applying a voltage potential across its two intersecting lines. The utilization of this multiplexing scheme relies upon the innate voltage threshold characteristic of the display material, which provides an optical change only for applied potentials greater than the threshold voltage. Thus, pixels can experience an increased voltage potential, because they are coupled to one of the address lines with an applied potential, but they will not be activated because the potential increase caused by the potential on one line is below the threshold voltage of the pixel.

Matrix light influencing displays, such as liquid crystal displays which rely only upon the innate liquid crystal display threshold voltage to differentiate the applied voltage potentials are limited in the number of pixels, contrast and speed because of the finite sharpness of the threshold voltage. To achieve high resolution liquid crystal display matrices with large numbers of pixels with acceptable contrast and speed, it is necessary to include an additional isolation device at each pixel to provide adequate isolation from potentials applied to other pixels on the common address lines. These so-called active matrix liquid crystal displays utilize a number of types of two or three terminal isolation devices to provide the required isolation from the applied voltage potentials. By the term "isolation" is meant any device which enhances the ability for one pixel to be addressed (switched) without switching other pixels on a common address line. Such "isolation" can include threshold devices such as diodes in various configurations, M-I-M structures, etc., which provide a more precise voltage threshold than that provided by the light influencing material itself. A more precise voltage threshold means a smaller variance in the voltage (smaller $\Delta v$) required to switch the pixel from off to on. Other examples of isolation devices can include switching devices, such as thin film transistors, which can have a very small $\Delta v$.

Some two terminal isolation devices, such as diodes and some configurations of three terminal devices can be thought of as single polarity devices, which can be turned on in only one direction or polarity. Three terminal devices, such as thin film transistors and other two terminal devices, such as diode rings, threshold switches, metal-insulator-metal (M-I-M) devices and $N^+$-I-$N^+$ devices, can be thought of as dual polarity devices which can be turned on in two directions or polarities.

One problem in using active matrix light influencing displays is yield. Virtually one-hundred percent of all of the isolation devices must be operational to obtain a useable display. Such yields can be difficult to achieve for large area displays, because the making of active matrix displays requires numerous process steps, many of which can require extremely accurate photolithography.

Diodes suitable for isolation devices in active matrix display applications are disclosed in U.S. application Ser. No. 573,004, entitled "Liquid Crystal Displays Operated By Amorphous Silicon Alloy Diodes", in the names of Zvi Yaniv, Vincent D. Cannella, Gregory L. Hansell and Louis D. Schwartz, filed Jan. 23, 1984, which is incorporated herein by reference. The diodes can be formed without the need of precise photolithography and in fewer process steps than that required to form some of the prior isolation devices.

The individual pixel structures in some prior light influencing displays result in lower frequency operation, more complex electronic circuitry, less flexibility, reduced yield and less isolation than desired. Whether utilizing diodes or transistors as isolation devices, the prior circuits have the pixel isolation devices, one address line and one electrode on one substrate or plane and the other electrode and address line on the other plane. In effect, the display material and the two electrodes form a capacitor which limits the operational frequency. The electronic circuitry is more complex than desired and limits the flexibility of the displays, since both planes have circuitry thereon. Where there is no redundancy in the pixel isolation devices, any one inoperative device will cause an inoperative pixel element reducing the display yield. Further, the prior display pixels in attempting to reduce the circuitry on both planes, generally are limited to a pair of electrodes with the isolation device or devices only on one plane and coupled to only one electrode address line on that plane.

A display of the type having a structure in which all of the addressed electronic circuitry, including isolation devices where utilized, is located at one electrode side of each pixel electrode combination, is disclosed in U.S. patent application Ser. No. 626,133 entitled "Displays And Subassemblies Having Improved Pixel Electrodes", in the names of Zvi Yaniv, Yair Bar-on, Vincent D. Cannella and Gregory L. Hansell, filed June 29, 1984, now U.S. Pat. No. 4,589,733 which is incorporated herein by reference. The structure includes the subdivision of one pixel electrode into at least two spaced apart side-by-side electrode segments on one plane opposite one common electrode on a second plane for each pixel. Light influencing material is disposed between the electrode segments and the common electrode. The segmented electrode can increase the operational frequency while decreasing the electronic complexity of the display. The address lines can be coupled to each segmented electrode by one or more isolation devices to provide more complete pixel isolation and to increase the manufacturing yield of the displays.

SUMMARY OF THE INVENTION

The present invention provides a display with optimized capacitance of the type having a structure in which all of the addressed electronic circuitry, including isolation devices where utilized, is located at one electrode side of each pixel electrode combination. The structure includes the subdivision of one pixel electrode into at least two spaced apart side-by-side electrode segments on one plane opposite one common electrode on a second plane for each pixel. Light influencing material is disposed between the electrode segments and the common electrode which forms a first capacitance. A second capacitance is formed electrically in parallel with the first capacitance.

The second capacitance can include a floating capacitor electrode formed spaced from and below the segmented electrode. The capacitor electrode can be formed from metal or a transparent electrode and can be spaced from the segmented electrode by an insulating layer and is selected to optimize the pixel capacitance. The utilization of the segmented electrode decreases the capacitance of the display pixels from that of conventional structures while decreasing the electronic complexity of the display. The present invention allows the capacitance to be increased from the decreased value to a value which is optimized for the electronic circuitry. The address lines can be coupled to each segmented electrode by one or more isolation devices to provide more complete pixel isolation and to increase the manufacturing yield of the displays.

The present invention provides a display including at least one pixel element. The pixel element is formed with a segmented electrode including at least a pair of spaced apart electrode segments, a common electrode spaced from the segmented electrode in substantially parallel relation thereto, light influencing material between the segmented electrode and the common electrode forming a first capacitance and a second capacitance in parallel with the first capacitance. The second capacitance can be formed from a conductive capacitor electrode spaced from the segmented electrode by an insulating layer. At least one isolation device can be coupled to the electrode segments and a pair of isolation devices preferably can be coupled to the electrode segments. The isolation devices can be diodes which can be formed from a deposited semiconductor material.

The present invention further provides a display subassembly, which display includes at least one pixel element. The subassembly includes a substrate, a segmented electrode including at least a pair of spaced apart electrode segments formed on the substrate, at least one address line coupled to each of the electrode segments and capacitance means for adding capacitance in parallel with the finished display pixel. The capacitance means can include a capacitor electrode spaced from the segmented electrode by a insulating layer. The subassembly can include isolation devices coupling one or both lines to the electrode segments and formed on the same plane or substrate.

The present invention also provides a method of making a display which includes at least one pixel element. The method includes providing a substrate, forming insulated capacitance means on the substrate, forming a segmented electrode including at least a pair of spaced apart electrode segments on the insulated capacitance means, forming at least one address line for each of the electrode segments, forming a common electrode overlying the electrode segments and applying light influencing display material between the segmented electrode and the common electrode with the common electrode and segmented electrode forming a first capacitance and the segmented electrode and the capacitance means forming a second capacitance in parallel with the first capacitance. The capacitance means can include a capacitor electrode spaced from the segmented electrode by an insulating layer. The method can include forming isolation devices coupling the address lines to the electrode segments.

The invention still further provides a method of making a display subassembly, which display includes at least one pixel element. The method includes providing a substrate, forming insulated capacitance means on the substrate, forming a segmented electrode including at least a pair of spaced apart electrode segments on the insulated capacitance means and forming at least one address line coupled to each of the electrode segments. The capacitance means can include a capacitor electrode spaced from the segmented electrode by an insulating layer. The method can include forming isolation devices to couple one or both of the address lines to the electrode segments.

The display subassembly can then have light influencing display material applied between at least the segmented electrode and the common electrode to form a completed display.

DESCRIPTION OF THE PREFERRED EMBODIMENTS

Figure 1:
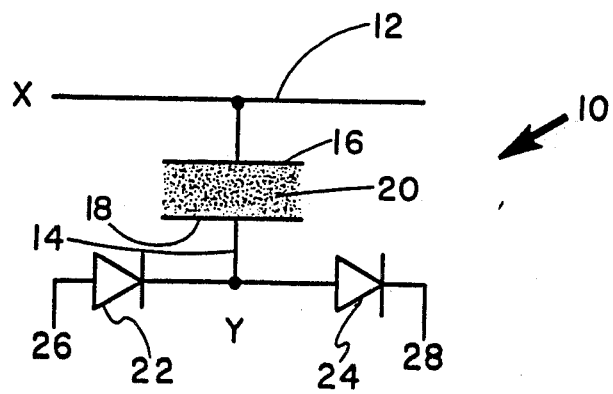
FIG. 1 is a schematic circuit diagram illustrating a display pixel with isolation devices.

Referring now to FIG. 1, a schematic diagram of an improved light influencing display pixel 10 is best illustrated. The pixel 10 is fully disclosed in above-referenced application Ser. No. 573,004. The pixel 10 includes a first x addressing line 12 which is coupled through the pixel to a y addressing line 14. The addressing line 12 is generally formed on one plane or substrate (not illustrated) and is coupled to a first electrode 16. The y addressing line 14 is generally formed on a second plane or substrate (not illustrated) and is coupled to a second electrode 18. A light influencing material, such as liquid crystal display material 20 is applied between the electrodes 16 and 18, which effectively forms a capacitor. Again, as above mentioned, by the term "light influencing material" is meant any material which emits light or can be used to selectively vary the intensity, phase, or polarization of light either being reflected from or transmitted through the material. Liquid crystal material is one such material having these characteristics.

The y addressing line 14 typically includes at least one dual polarity isolation device, such as a transistor (not illustrated) or a pair of single polarity isolation devices 22 and 24. Each of the devices 22 and 24 has a respective address line 26 and 28, respectively. The devices 22 and 24 are illustrated as diodes for simplicity, but can be any type of single polarity isolation device. Again, as above mentioned, by the term "isolation device" is meant any device which enhances the ability for one pixel to be addressed (switched) without switching other pixels on a common address line.

It is known that the useful life of a nematic liquid crystal display material can be extended if the polarity of the applied voltage potential is periodically reversed, such as during alternate display frames. This can be accomplished, for example, with the pixel 10 by applying a positive potential on line 26 and a negative potential on line 12 during one frame or time period to forward bias the diode 22 and effectively charge the capacitor in one polarity. The next time period or frame, a positive potential is applied to the line 12 and a negative potential is applied to the line 28 to forward bias the diode 24. Repeating this sequence causes the potential applied to the capacitor and hence the liquid crystal display material 20 to be reversed during alternate frames. The switching speed or frequency is limited by the time it takes to charge the capacitor.

The pixel 10 requires that addressed electronic circuitry be formed on both planes which requires connectors to both planes on opposite sides of the liquid crystal display material. The operating frequency is limited by the capacitor formed by the pixel electrodes and the liquid crystal display material. Full isolation for the pixels can only be accomplished by adding isolation devices to the x addressing line 12, further complicating the circuitry on the second plane. Also, no redundancy is provided for the isolation devices 22 and 24 and if one is defective the pixel 10, and hence the display, will be defective. Although just one pixel element is illustrated in the FIGS., it can be appreciated that many such pixels can be formed in, for example, a row and column arrangement to provide a complete liquid crystal display of any size.

Figure 2:
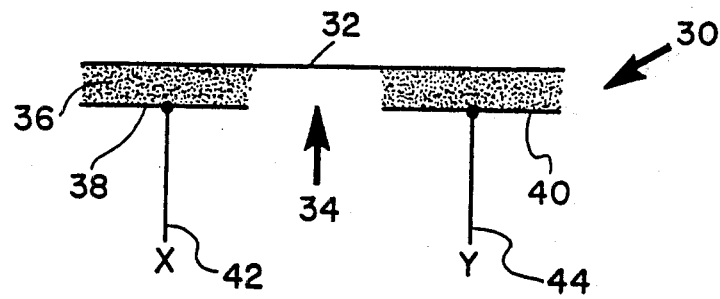
FIG. 2 is a schematic circuit diagram illustrating a display pixel with segmented electrodes.

FIG. 2 illustrates a first pixel embodiment 30 having a segmented electrode. The pixel 30 is fully disclosed in above-referenced application Ser. No. 626,133. The pixel 30 includes a common electrode 32 having at least one electrode segment on one plane (not illustrated) separated from a second segmented electrode 34 on a second plane (not illustrated) by a light influencing material, such as liquid crystal display material 36. The segmented electrode 34 is subdivided into at least a pair of spaced apart electrode segments 38 and 40 coupled to separate respective x and y address lines 42 and 44. The electrode segments 38 and 40 provide the pixel 30 with a number of advantages over the pixel 10. All the addressed electronic circuitry can be formed on the same plane with the electrode segments 38 and 40. The common electrode 32 on the opposite plane can merely be a floating electrode with no pixel addressing circuitry connected to it.

Further, the electrode segments 38 and 40, the liquid crystal display material 36 and the common electrode 32 result in a capacitor with one-quarter of the capacitance of the above described capacitor of the pixel 10. Assuming the liquid crystal display material is the same as that in the pixel 10, and the electrode spacing is the same, then the result is two capacitors, each equivalent to one-half the prior capacitor, in series. These two capacitors in series result in one-quarter the capacitance which requires twice the voltage, but one-half the charge to obtain the same field. Thus, utilizing the same current, the frequency is doubled.

If the liquid crystal display material 36 is a nematic liquid crystal display material, the applied voltage potential should be reversed periodically, such as the beginning of each frame. This can be accomplished by applying a positive potential on line 42 and a negative potential on line 44 in the first time frame. In the next time frame, a positive potential is applied to the line 44 and a negative potential to the line 42 to reverse the applied voltage potential. This sequence is repeated to enhance the lifetime of the liquid crystal display material.

As more fully described in Ser. No. 626,133, the address lines can be coupled by a number of isolation devices in different configurations to the electrode segments 38 and 40. These isolation devices and configurations will be described with respect to the following FIGS. which describe the pixels embodying the present invention. Although the pixel 30 provides a number of addressing advantages including the reduced capacitance, there are applications where the pixel capacitance should be increased. Light influencing material which can be turned on very quickly may in turn relax very quickly. Therefore, it is sometimes desirable to maintain the electric field for a longer period of time which can be achieved by increasing the pixel capacitance. Light influencing material with lower resistivity can utilize higher capacitance structures to maintain the applied voltage for the entire frame time despite the higher leakage currents.

Figure 3:
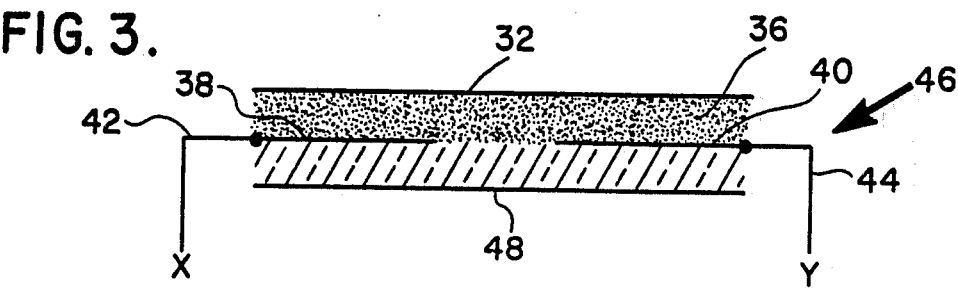
FIG. 3 is a schematic diagram illustrating a first display pixel embodying the present invention.

FIG. 3 illustrates a first pixel embodiment 46 of the invention. The pixel 46 is similar to the pixel 30 and numerals corresponding to the elements in the pixel 30 are utilized where applicable. Again, the common electrode 32, the light influencing material 36 and the electrode segments 38 and 40 form a pixel capacitance. In accordance with the invention, a second pixel capacitance is formed by a capacitance electrode 48 and an insulating layer 50, which are first formed on the first plane (not illustrated), along with the electrode segments 38 and 40. The electrode 48 has no external electrical connections and is just a floating isolated conductive element which is designed for the optimum capacitance.

The capacitance of the pixel 46 can be increased as desired by up to a factor of about one-hundred depending upon the thickness and type of insulating layer 50.

The increased pixel capacitance is inversely proportional to the thickness of the insulating layer 50 and directly proportional to the dielectric constant of the insulator chosen. The insulating layer is formed of a sufficient thickness to be pin hole (electrical short) free and preferably is formed of a substantially transparent insulator, such as a silicon oxide ($SiO_x$). The layer 50 can be formed from silicon dioxide in the range of 500–5000 Angstroms in thickness and preferably about 2000 Angstroms thick. The dielectric constant of $SiO_2$ is about 4.0 which allows an increased capacitance up to a factor of about twenty. Other insulators can be chosen with higher dielectric constants, especially where transparency is not important. For example, the dielectric constant of SiO is about 6.0, $Al_2O_3$ is about 9.0, $Si_3N_4$ is about 7.0 to 9.0 and $Bi_2O_3$ is about 18.0.

The electrode 48 can be formed from a metal, such as aluminum, chromium or molybdenum or from a transparent conductor such as indium tin oxide or tin oxide. For the largest capacitance increase, the electrode 48 will be made substantially coextensive in area with the active areas of the segmented electrode 34. The active areas of the electrode 34 are those portions of the electrode segments 38 and 40 coextensive with the common electrode 32 and not covered by address lines, isolation devices or other elements (See FIGS. 8 and 10).

Figure 4:
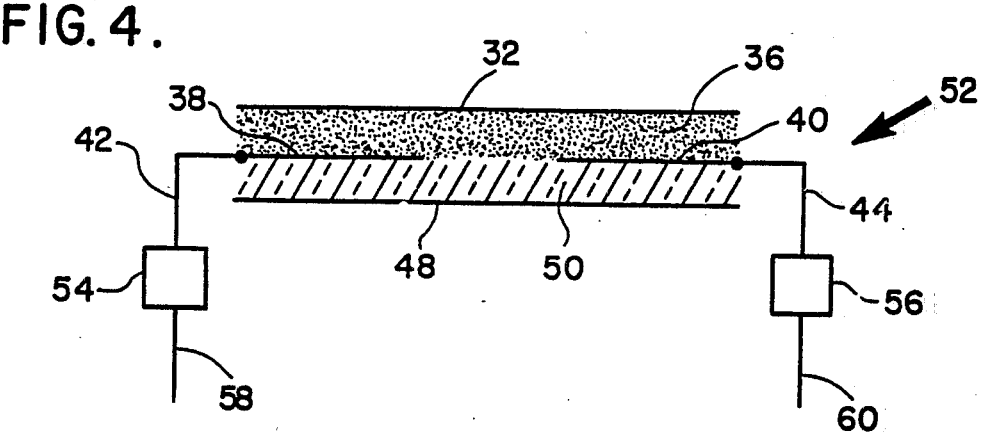
FIG. 4 is a schematic circuit diagram illustrating a second display pixel embodying the present invention.

FIG. 4 illustrates a second pixel embodiment 52 of the invention, again with elements corresponding to the elements in the pixel 30 having the same numerals. The pixel 52 includes a pair of dual polarity isolation devices 54 and 56 coupled to respective address lines 42 and 44 and to address lines 58 and 60. Although one isolation device is illustrated coupled to each of the electrode segments 38 and 40, since the devices are dual polarity only one of the electrode segments needs to be coupled to an isolation device. The second isolation device adds redundancy to the pixel 52, since the pixel 52 will operate with one of the isolation devices shorted. The applied voltage potential can be reversed as previously described, by alternating the polarity of the one or two isolation devices along with the applied potentials.

Figure 5:
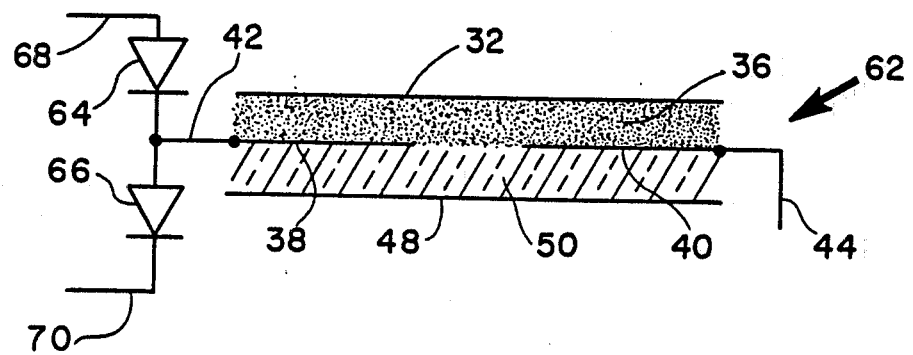
FIG. 5 is a schematic circuit diagram illustrating another display pixel embodying the present invention.

FIG. 5 illustrates another pixel embodiment 62 of the invention, again utilizing numerals corresponding to the pixel 30 where applicable. The electrode segment 38 and the addressing line 42 are coupled through a pair of isolation devices 64 and 66 which are coupled to separate respective lines 68 and 70. To reverse the polarity on the pixel 62, in one time frame a positive potential is applied to the line 68 and a negative potential to the line 44 to forward bias the diode 64. In the next frame, a positive potential is applied to the line 44 and a negative potential to the line 70 to forward bias the diode 66. Generally, the same polarity potential will be applied to both of the lines 68 and 70 in each time frame to reverse bias the other diode.

Figure 6:
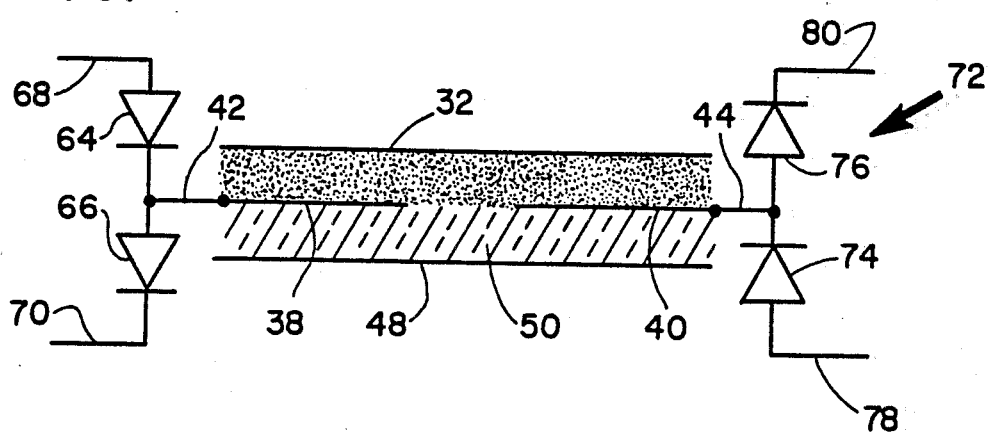
FIG. 6 is a schematic circuit diagram illustrating a further display pixel embodying the present invention.

Another pixel embodiment 72 is illustrated in FIG. 6. The corresponding numerals are again utilized without further description. The pixel 72 includes a second pair of isolation devices 74 and 76 coupled to the address line 44 and to respective address lines 78 and 80. The second pair of devices 74 and 76 add more complete isolation to the pixel 72 and also provide redundancy to the pixel 72. The pixel 72 and hence the display will operate with any one of the isolation devices 64, 66, 74 and 76 shorted. As will be discussed hereinafter, the most likely defect in the preferred type of isolation device is an electrical short.

To reverse the polarity on the pixel 72, in one time frame a positive potential is applied to the line 68 and a negative potential is applied to the line 80 to forward bias the isolation devices 64 and 76. In the next frame, a positive potential is applied to the line 78 and a negative potential to the line 70 to forward bias the isolation devices 66 and 74. Again, the second devices can be reverse biased in each time frame.

Figure 7:
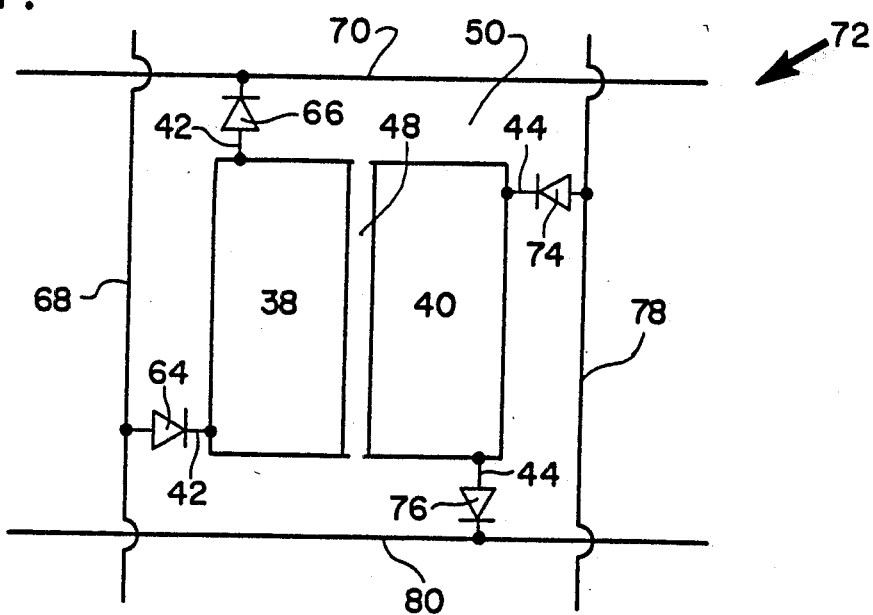
FIG. 7 is a partial schematic and diagrammatic diagram of a display pixel subassembly embodying the present invention.

Referring to FIG. 7, a partially diagrammatic and partially schematic diagram of one embodiment of the pixel 72 is illustrated. The common electrode 32 is not illustrated, but would substantially overlie the areas of the electrode segments 38 and 40 and the electrode 48. Separate y line connections 42 are shown as well as separate x line connections 44 to the pixel electrode segments 38 and 40. Electrically these are equivalent to the schematic diagram in FIG. 3. Each of the lines 68, 70, 78 and 80 is isolated from one another. The lines 68, 70, 78 and 80, the segments 38 and 40, the lines 42 and 44 and the devices 64, 66, 74 and 76 are all formed on top of the insulating layer 50.

Figure 8:
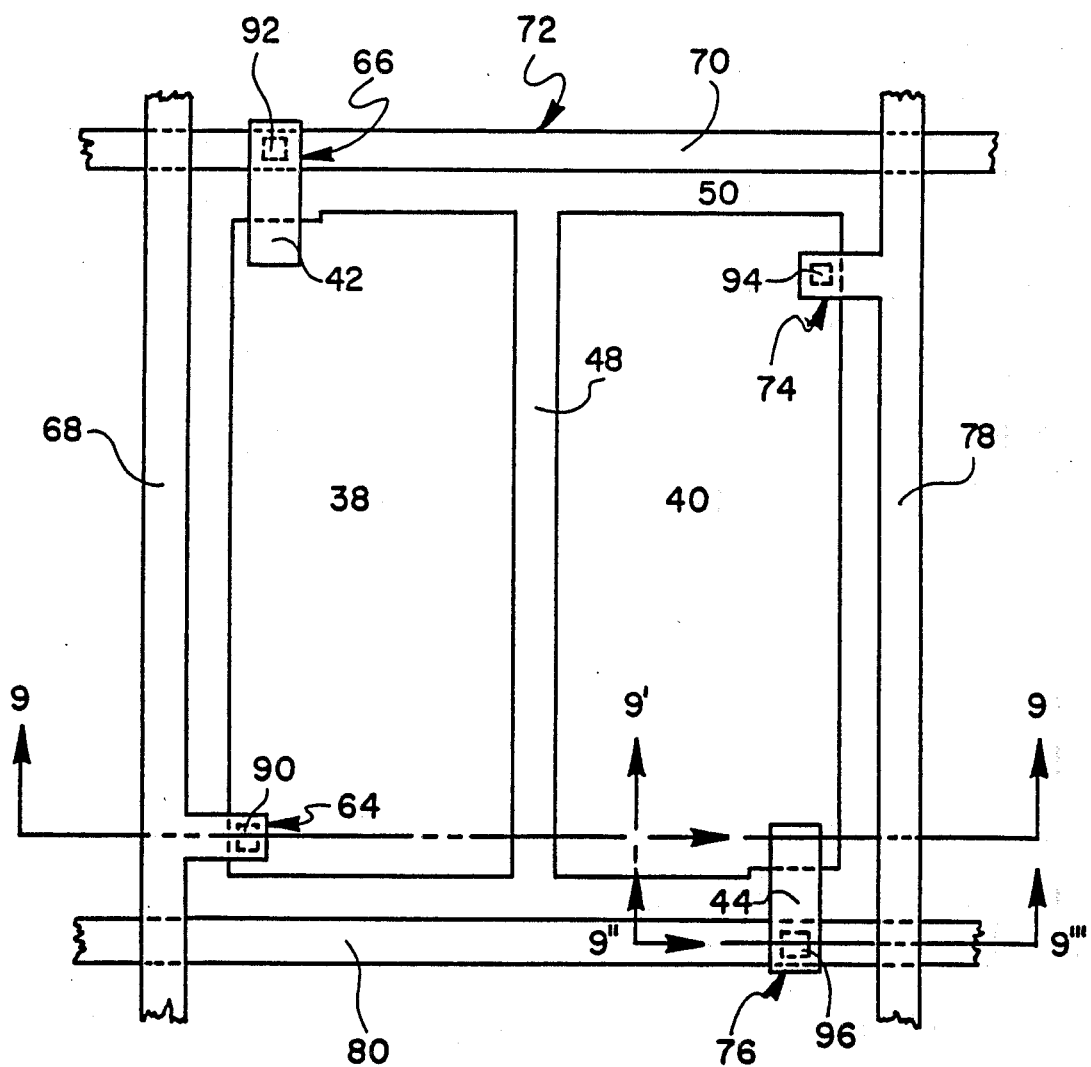
FIG. 8 is a top plan view of one display pixel subassembly embodying the present invention.
Figure 9:
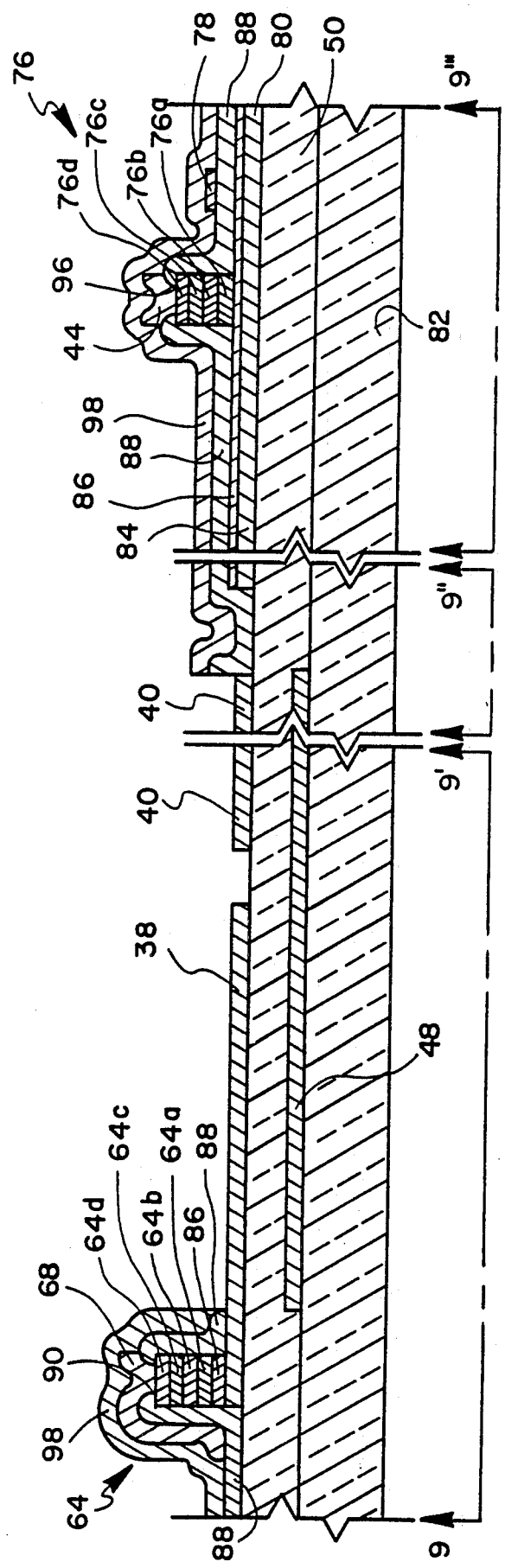
FIG. 9 is a cross sectional side view of the display pixel subassembly of FIG. 8 taken along the lines 9–9', 9'–9'' and 9''–9''' of FIG. 8.

The pixel 72 is illustrated in top plan view in FIG. 8 and a side sectional view in FIG. 9. The cross sectional view in FIG. 9 is taken along the line 9-9', 9'-9'' and 9''-9''' in FIG. 8. The pixel 72 is formed on an insulative substrate 82, such as glass. The substrate 82 can be obtained with a transparent conductive layer thereon, such as deposited indium tin oxide (ITO) which can be patterned to form the electrode 48. The insulating layer 50 is then deposited over the electrode 48. The electrode segments 38 and 40 are formed on the insulating layer 50 and can be formed of a transparent conductive layer 84, such as deposited ITO. Both layers 48 and 84 can be in the range of 400–5000 Angstroms thick and preferably are between 500 and 1000 Angstroms thick. The lines or leads 70 and 80 are also formed on the insulating layer 50. The lines 70 and 80 can be formed from the ITO layer 84 and a top metal layer 86, or they can be formed from just a conductive material such as metal, for example, aluminum, molybdenum, or a molybdenum tantalum alloy. Other suitable metals are chromium, tantalum tungsten, palladium and platinum. The lines 70 and 80 can be formed by, for example, magnetron sputtering the metal over the entire surface area of the insulating layer 50 and then removing selected portions of the deposited metal by utilizing a mask and photolithography techniques of the types well known in the art.

The isolation devices 64, 66, 74 and 76 then are formed, preferably from a deposited semiconductor material. The devices are formed as diodes for illustration purposes, but can be any of the above enumerated isolation devices. The deposited semiconductor material is preferably an amorphous semiconductor alloy including silicon. The amorphous silicon alloy can also include hydrogen and/or fluorine and can be deposited by plasma assisted chemical vapor deposition i.e. glow discharge as disclosed, for example, in U.S. Pat. No. 4,226,898 which issued on Oct. 7, 1980 in the names of Stanford R. Ovshinsky and Arun Madan for Amorphous Semiconductors Equivalent To Crystalline Semiconductors Produced By A Glow Discharge Process. The diodes preferably have a p-i-n configuration, best illustrated in FIG. 9, formed by a first doped region 64a and 76a, which can be n-type, an intrinsic region 64b and 76b overlying the first doped regions 64a and 76a respectively, and a second doped region 64c and 76c, which can be p-type, overlying the intrinsic regions 64b and 76b respectively. The diodes also preferably include a top conductive layer 64d and 76d.

More specifically, the diodes can be formed by depositing the previously mentioned conductive layer 84, metal layer 86, amorphous silicon alloy regions and top conductive layer over the entire surface area of the layer 50, and thereafter selectively etching portions of the top metal layer and amorphous silicon alloy regions by utilizing a suitable mask and conventional photolithography techniques. The mask utilized during the etching process preferably defines a diode configuration wherein each diode is about 20 to 50 microns on a side. Representative thicknesses for the amorphous silicon alloy regions can be, for example, 300 to 1,000 Angstroms and preferably 500 Angstroms for the p-type regions, 1,000 to 10,000 Angstroms and preferably 3,000 Angstroms for the intrinsic regions, and 100 to 500 Angstroms and preferably 200 Angstroms for the n-type regions.

Once the diodes are formed on the metal layer 86, the diode patterned resist is removed and new resist layers are coated and patterned to form the electrode segments 38 and 40 without the metal layer 86 and the bottom lines 70 and 80 with the metal layer 86. Alternately, the bottom lines 70 and 80 can first be formed of metal and then the diodes formed thereon. Thus, the diode 64 is formed on the electrode segment 38, the diode 74 on the electrode segment 40, the diode 76 on the line 80 and the diode 66 on the line 70.

A layer of insulating material 88 is next formed over the lines 70 and 80, the insulating layer 50, the electrode segments 38 and 40, and the diodes 64, 66, 74 and 76. The insulating material 88 can be formed from any deposited insulator such as silicon oxide ($Si_xO_y$) or silicon nitride ($Si_xN_y$), for example. The insulating layer 88 is patterned to define openings or vias 90, 92, 94 and 96 which communicate with the diodes 64, 66, 74 and 76. The layer 88 is also patterned to expose the electrode segments 38 and 40. The pattern of the layer 88 can be obtained by depositing the insulator, for example, over the entire surface area, coating a layer of photoresist over the insulator layer, and then exposing and developing out both of the photoresist and the insulator using a further mask. This step forms the openings or vias 90, 92, 94 and 96 and uncovers upper surface portions of the electrode segments 38 and 40.

The top lines 42, 44, 68 and 78 are then formed coupling the lines, diodes and electrode segments together. The top lines can be formed of a conductive material of the same type as described for the lines 70 and 80. The conductive material for the top lines is generally chosen to be different than that of the bottom lines to obtain a differential etch. A top passivation layer 98 is then formed over the exposed surfaces, which layer is patterned to expose the electrode segments 38 and 40. The top passivation layer 98 can be formed of the same materials and in the same manner as the layer 88.

This forms a completed subassembly of the display and pixel 72. The subassembly is an intermediate product in the manufacturing of the display. The subassembly can be stocked for later use or sold for completion into a display by another party. Further, as more fully described in copending application Ser. No. 626,214, entitled "High Yield Liquid Crystal Display And Method Of Making Same", filed June 29, 1984, the subassembly can be electronically tested prior to adding the light influencing material since the electronic circuitry is all on the one substrate 82.

Figure 10:
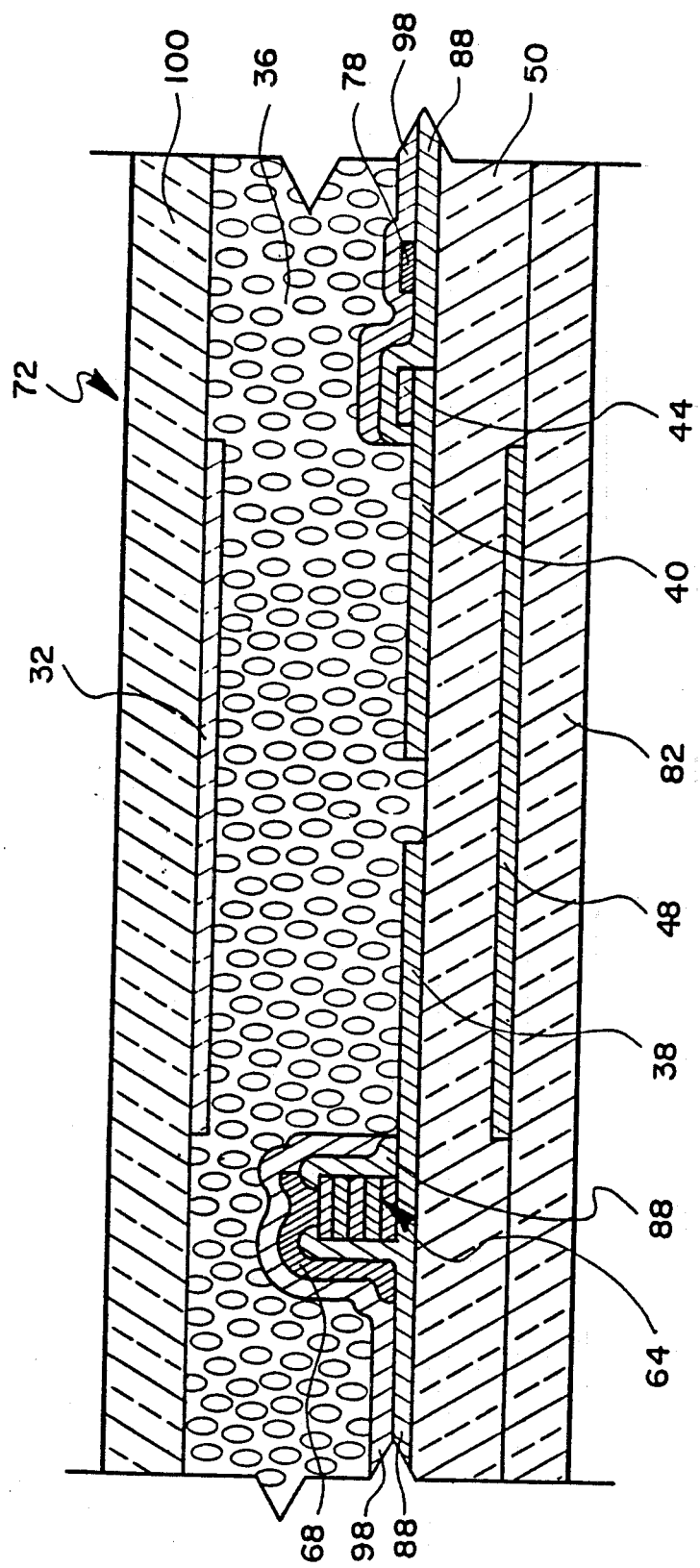
FIG. 10 is a second cross sectional side view of the completed display pixel of FIG. 8 taken along the line 9—9 of FIG. 8 with the light influencing material applied.

FIG. 10 illustrates a cross sectional side view of the pixel 72 along the line 9—9 of FIG. 8 with a top plane 100, the common electrode 32 and the pixel liquid crystal display material 36. The pixel 72 in FIG. 10 is a completed display pixel.

It must be appreciated that the structure illustrated in FIGS. 8-10 is not drawn to scale and that the common electrode 32 and the active electrode segments 38 and 40 define the light influencing display area of the pixel 72. The electrode segments 38 and 40, the layer 50 and the electrode 48 define the added capacitance. The electrodes preferably are substantially coextensive and can be configured in a square configuration as illustrated in FIG. 8 and can be, for example, 100 to 2,000 microns on a side depending on the overall size of the finished display matrix and the desired aspect ratio. The light influencing material 36 can be of any conventional variety, as for example nematic liquid crystal display material.

As can be appreciated by those skilled in the art, the present invention can be practiced otherwise than as specifically disclosed herein. For example, the diodes of the displays can be formed from deposited semiconductor materials other than amorphous semiconductor alloys which need not be deposited materials. For example, the diodes can be formed from polycrystalline semiconductor alloys. Furthermore the amorphous semiconductor alloy material diodes can be formed from other material configurations than the p-i-n configuration described herein. For example, configurations such as p-π-n, p-ν-n, p-n, Schottky, etc are possible where π and ν refer to lightly doped p and n-type semiconductor material respectively. Also, if a high voltage threshold is desired for the pixels, the diodes can be formed in a stacked or tandem configuration. Further, as above mentioned, the isolation devices can be other than diodes, such as transistors or other dual polarity devices.

I claim:

1. In a display, including a matrix of pixels, at least one of said pixels having a pixel capacitance and an auxiliary capacitance and comprising:
   a first electrode including at least two spaced apart electrode portions;
   a second electrode spaced from and facing said first electrode portions in substantially parallel relation thereto said second electrode also being electrically insulated from all external circuit connections and from all other pixel electrodes;
   light influencing display material between said first electrode and said second electrode;
   a third electrode spaced from and facing said first electrode on the side of said first electrode opposite said light influencing material, said third electrode also being electrically insulated from all external circuit connections and from all other pixels, said second electrode forming with said first electrode said pixel capacitance and said third electrode forming with said first electrode said auxiliary capacitance electrically in parallel with said pixel capacitance.

2. The display as defined in claim 1 wherein the active surface area of said third electrode is substantially coextensive with at least substantially all of the active surface area of said first electrode.

3. The display as defined in claim 1 wherein said third electrode is insulated from said first electrode by an insulating layer formed of a silicon oxide ($SiO_x$).

4. The display as defined in claim 1 wherein said third electrode is formed from a metal.

5. The display as defined in claim 4 wherein said metal is aluminum, chromium, or molybdenum.

6. The display as defined in claim 1 wherein said third electrode is formed from a transparent conductor.

7. The display as defined in claim 6 wherein said transparent conductor is indium tin oxide or tin oxide.

8. The display as defined in claim 1 further including at least one isolation device coupled to at least one of said first electrode portions.

9. The display as defined in claim 8 including at least isolation device coupled to each of said first electrode portions.

10. The display as defined in claim 1 further including at least a pair of isolation devices coupled to at least one of said first electrode portions.

11. The display as defined in claim 10 including a pair of isolation devices coupled to each of said first electrode portions.

12. The display as defined in claim 10 wherein said isolation devices are diodes formed from deposited semiconductor material.

13. The display as defined in claim 1 wherein said light influencing material is liquid crystal display material.

14. The display as defined in claim 13 wherein said liquid crystal display material is nematic material.

15. A method of making at least one pixel of a light influencing display including a matrix of pixels, said at least one pixel having a pixel capacitance and an auxiliary capacitance, said method comprising:
    providing a substrate;
    forming an auxiliary capacitance electrode so as to be electrically insulated from all external circuit connections and all other pixels;
    forming a first pixel electrode including at least two spaced apart electrode portions spaced from and facing said auxiliary capacitance electrode;
    forming at least one address line for each of said first pixel electrode portions;
    forming a second pixel electrode spaced from and facing said first pixel electrode in substantially parallel relation thereto, said second pixel electrode being formed so as to be electrically insulated from all external circuit connections and from all other pixel electrodes; and
    applying a light influencing display material between said first pixel electrode and said second pixel electrode,
    said second pixel electrode with said first pixel electrode said pixel capacitance and said auxiliary capacitance electrode and said first pixel electrode forming said auxiliary capacitance electrically in parallel with said pixel capacitance.

16. The method as defined in claim 15 including forming the active surface area of said auxiliary capacitance electrode substantially coextensively with at least substantially all of the active surface area of said first pixel electrode.

17. The method as defined in claim 15 including forming an insulating layer from a silicon oxide ($SiO_x$) between said auxiliary capacitance electrode and said first pixel electrode.

18. The method as defined in claim 15 including forming said auxiliary capacitance electrode from a metal.

19. The method as defined in claim 18 including forming said auxiliary capacitance electrode from aluminum, chromium, or molybdenum.

20. The method as defined in claim 15 including forming said auxiliary capacitance electrode from a transparent conductor.

21. The method as defined in claim 20 including forming said transparent conductor from indium tin oxide or tin oxide.

22. The method as defined in claim 15 further including forming at least one isolation device coupling at least one of said first pixel electrode portions to one of said address lines.

23. The method as defined in claim 22 including forming at least one isolation device coupling each of said first pixel electrode portions to one of said address lines.

24. The method as defined in claim 23 further including forming at least a pair of isolation devices coupling at least one of said first pixel electrode portions to one of said address lines.

25. The method as defined in claim 24 including forming a pair of isolation devices coupling each of said first pixel electrode portions to one of said address lines.

26. The method as defined in claim 24 including forming said isolation devices as diodes from deposited semiconductor material.

27. The method as defined in claim 15 including forming said light influencing material from liquid crystal display material.

28. The method as defined in claim 27 including forming said liquid crystal display material from nematic material.

* * * * *